United States Patent
Hwang et al.

(10) Patent No.: US 10,104,674 B2
(45) Date of Patent: Oct. 16, 2018

(54) RATE ASSIGNMENT WITH RATE SPLITTING FOR INTERFERENCE CANCELLATION FRIENDLY NEW AIR INTERFACE

(71) Applicant: MEDIATEK INC., Hsinchu (TW)

(72) Inventors: Chien-Hwa Hwang, Hsinchu County (TW); Lung-Sheng Tsai, Tainan (TW); Yi-Ju Liao, Hsinchu (TW); Tsang-Wei Yu, Hsinchu County (TW); Pei-Kai Liao, Nantou County (TW)

(73) Assignee: HFI Innovation INC., HsinChu (TW)

( * ) Notice: Subject to any disclaimer, the term of this patent is extended or adjusted under 35 U.S.C. 154(b) by 13 days.

(21) Appl. No.: 15/341,846

(22) Filed: Nov. 2, 2016

(65) Prior Publication Data
US 2017/0135114 A1 May 11, 2017

Related U.S. Application Data

(60) Provisional application No. 62/251,787, filed on Nov. 6, 2015.

(51) Int. Cl.
*H04W 4/00* (2018.01)
*H04W 72/08* (2009.01)
(Continued)

(52) U.S. Cl.
CPC ........... *H04W 72/082* (2013.01); *H04J 11/00* (2013.01); *H04L 1/00* (2013.01); *H04L 1/0003* (2013.01);
(Continued)

(58) Field of Classification Search
CPC ......... H04W 72/082; H04J 11/00; H04L 1/00; H04L 1/0003; H04L 1/0009; H04L 1/0041; H04L 1/0048; H04L 25/0202
(Continued)

(56) References Cited

U.S. PATENT DOCUMENTS

| | | | |
|---|---|---|---|
| 2008/0307427 A1 | 12/2008 | Pi et al. | 718/104 |
| 2011/0195704 A1* | 8/2011 | Choi | H04W 72/1263 455/423 |

(Continued)

FOREIGN PATENT DOCUMENTS

| | | |
|---|---|---|
| CN | 101827452 A | 9/2010 |
| CN | 101882978 A | 11/2010 |

(Continued)

OTHER PUBLICATIONS

International Search Report and Written Opinion of International Search Authority for PCT/CN2016/104622 dated Feb. 7, 2017 (11 pages).

(Continued)

*Primary Examiner* — Christopher R Crompton
(74) *Attorney, Agent, or Firm* — Imperium Patent Works; Zheng Jin

(57) ABSTRACT

A new air interface that is interference cancellation friendly is proposed. In one novel aspect, a novel code rate assignment with rate splitting is proposed. In one embodiment, a base station decomposes a codeword $\{x_1\}$ into two codewords $\{x_{1a}\}$ and $\{x_{1b}\}$. The two codewords are applied with different code rates and/or modulation orders. More specifically, the code rate or modulation order of codeword $\{x_{1a}\}$ is set appropriately so that a victim UE can decode and cancel $\{x_{1a}\}$ under the channel quality of the victim UE. Typically, the channel quality of a victim UE is poorer than the channel quality of the intended UE. As a result, the MCS for $\{x_{1a}\}$ can be lower than the MCS for $\{x_{1b}\}$ such that the victim UE is able to apply CWIC to decode and cancel $\{x_{1a}\}$.

18 Claims, 10 Drawing Sheets

(51) Int. Cl.
*H04L 25/02* (2006.01)
*H04J 11/00* (2006.01)
*H04L 1/00* (2006.01)
*H04B 7/0452* (2017.01)
*H04W 88/08* (2009.01)
*H04W 92/10* (2009.01)

(52) U.S. Cl.
CPC .......... *H04L 1/0009* (2013.01); *H04L 1/0041* (2013.01); *H04L 1/0048* (2013.01); *H04L 25/0202* (2013.01); *H04B 7/0452* (2013.01); *H04L 1/0026* (2013.01); *H04L 1/0066* (2013.01); *H04L 2001/0093* (2013.01); *H04W 88/08* (2013.01); *H04W 92/10* (2013.01)

(58) Field of Classification Search
USPC ......................................................... 370/329
See application file for complete search history.

(56) References Cited

U.S. PATENT DOCUMENTS

| | | | |
|---|---|---|---|
| 2011/0235750 A1 | 9/2011 | Shin et al. | 375/296 |
| 2012/0115485 A1 | 5/2012 | Narasimha et al. | 455/437 |
| 2012/0120865 A1 | 5/2012 | Liang et al. | 370/315 |
| 2012/0214497 A1 | 8/2012 | Shin et al. | 455/449 |
| 2013/0044697 A1 | 2/2013 | Yoo et al. | 370/329 |
| 2013/0089023 A1 | 4/2013 | Shin et al. | 370/315 |
| 2013/0114438 A1 | 5/2013 | Bhattad et al. | 370/252 |
| 2013/0237210 A1* | 9/2013 | Kang | H04W 72/0426 455/422.1 |
| 2013/0258869 A1* | 10/2013 | Zhou | H04W 52/40 370/252 |
| 2013/0301432 A1 | 11/2013 | Hammarwall et al. | 370/252 |
| 2014/0211732 A1 | 7/2014 | Nogami et al. | 370/329 |
| 2015/0055518 A1 | 2/2015 | Park et al. | 370/280 |
| 2015/0319776 A1 | 11/2015 | Seo et al. | 370/329 |
| 2016/0088593 A1 | 3/2016 | Davydov et al. | 370/329 |
| 2016/0192373 A1 | 6/2016 | Li et al. | 370/329 |
| 2017/0294981 A1* | 10/2017 | Kim | H04J 13/10 |

FOREIGN PATENT DOCUMENTS

| | | |
|---|---|---|
| CN | 102045861 A | 5/2011 |
| CN | 103036826 A | 4/2013 |
| CN | 103368633 A | 10/2013 |
| CN | 104283630 A | 1/2015 |
| CN | 104380625 A | 2/2015 |
| CN | 104885543 A | 9/2015 |
| EP | 2369757 A2 | 9/2011 |
| WO | WO2012064600 A1 | 5/2012 |
| WO | WO2013169195 A1 | 11/2013 |

OTHER PUBLICATIONS

International Search Report and Written Opinion of International Search Authority for PCT/CN2016/104623 dated Jan. 24, 2017 (11 pages).
International Search Report and Written Opinion of International Search Authority for PCT/CN2016/104664 dated Jan. 26, 2017 (13 pages).
USPTO, office action for the related U.S. Appl. No. 15/342,275 dated Apr. 18, 2018 (15 pages).

* cited by examiner

RATE ASSIGNMENT WITH RATE SPLITTING FOR INTERFERENCE CANCELLATION FRIENDLY NEW AIR INTERFACE

CROSS REFERENCE TO RELATED APPLICATIONS

This application claims priority under 35 U.S.C. § 119 from U.S. Provisional Application No. 62/251,787, entitled "Interference Cancellation Friendly New Air Interface," filed on Nov. 6, 2015, the subject matter of which is incorporated herein by reference.

TECHNICAL FIELD

The disclosed embodiments relate generally to mobile communication networks, and, more particularly, to resource element mapping for interference cancellation friendly new air interface.

BACKGROUND

In a wireless cellular communications system, multiuser multiple-input multiple-output (MU-MIMO) is a promising technique to significantly increase the cell capacity. In MU-MIMO, the signals intended to different users are simultaneously transmitted with orthogonal (or quasi-orthogonal) precoders. On top of that, the concept of a joint optimization of multiuser operation from both transmitter and receiver's perspective has the potential to further improve multiuser system capacity even if the transmission/precoding is non-orthogonal which could come from, for example but not limited to, the simultaneous transmission of a large number of non-orthogonal beams/layers with the possibility of more than one layer of data transmission in a beam. Such non-orthogonal transmission could allow multiple users to share the same resource elements without spatial separation, and allow improving the multiuser system capacity for networks with a small number of transmit antennas (i.e. 2 or 4, or even 1), where MU-MIMO based on spatial multiplexing is typically limited by wide beamwidth. An example of such joint Tx/Rx optimization associated with adaptive Tx power allocation and codeword level interference cancellation (CWIC) receiver is recently a remarkable technical trend, including non-orthogonal multiple access (NOMA) and other schemes based on downlink multiuser superposition transmission (MUST).

When increasing of antenna number with multi-user transmission, capacity is expected to grow. However, limited feedback information results in non-ideal beamforming and MU paring, MU interference limits the capacity grow. Interference cancellation (IC) may be the tool to improve capacity region. For MU-MIMO, both cell average spectral efficiency and cell edge spectral efficiency improve when codeword level interference cancellation (CWIC) is used.

Interference problems exist for massive MU-MIMO under different deployment scenarios. For non-ultra-dense scenario, MU transmission is via different beams. Interference comes from sidelobe, reflection, diffraction, or non-ideal beamforming. There is certain interference and IC is still helpful. For ultra-dense scenario, MU transmission is via the same beam (i.e., multi-user superposition transmission (MUST)). It is difficult to separate signals in spatial domain due to crowded user. Wider beamwidth by <6 GHz massive MIMO antenna results in worse interference. Interference cancellation capability can significantly improve system capacity. Other interference problems exist in cellular networks. For example, inter-cell interferences come from neighbor cells for cell edge users, and DL-to-UL and UL-to-DL interferences result from dynamic time division duplex (TDD) configuration.

A new air interface that is interference cancellation friendly is desired.

SUMMARY

A new air interface that is interference cancellation friendly is proposed. In one novel aspect, a base station uses one subband as the basic scheduling unit for each transport block if CWIC is configured, e.g., by static or semi-static signaling. By the use of proper bit selection and resource element mapping, the coded bits of a same code block are transmitted in the same subband. The transmission of a subband includes an integer multiple number of code blocks. As a result, only interfering code blocks at subbands co-scheduled with desired transport blocks are decoded and cancelled.

In another novel aspect, a novel code rate assignment with rate splitting is proposed. In one embodiment, a base station decomposes a codeword $\{x_1\}$ into two codewords $\{x_{1a}\}$ and $\{x_{1b}\}$. The two codewords are applied with different code rates and/or modulation orders. More specifically, the code rate or modulation order of codeword $\{x_{1a}\}$ is set appropriately so that a victim UE can decode and cancel $\{x_{1a}\}$ under the channel quality of the victim UE. Typically, the channel quality of a victim UE is poorer than the channel quality of the intended UE. As a result, the MCS for $\{x_{1a}\}$ can be lower than the MCS for $\{x_{1b}\}$ such that the victim UE is able to apply CWIC to decode and cancel $\{x_{1a}\}$.

In yet another novel aspect, addition information is provided between eNB and UE for interference cancellation. From eNB perspective, it provides assistance information to UEs for CWIC. The assistance information may include modulation order and code rate information of the PDSCH for data transmission that may cause interference to other UEs. From UE perspective, it provides feedback information to the eNB for MCS level assignment. The feedback information may include additional channel quality and interference condition information of a data transmission of a desired transport block with respect to the decoding of the desired transport block.

Other embodiments and advantages are described in the detailed description below. This summary does not purport to define the invention. The invention is defined by the claims.

DETAILED DESCRIPTION

Reference will now be made in detail to some embodiments of the invention, examples of which are illustrated in the accompanying drawings.

Figure 1:
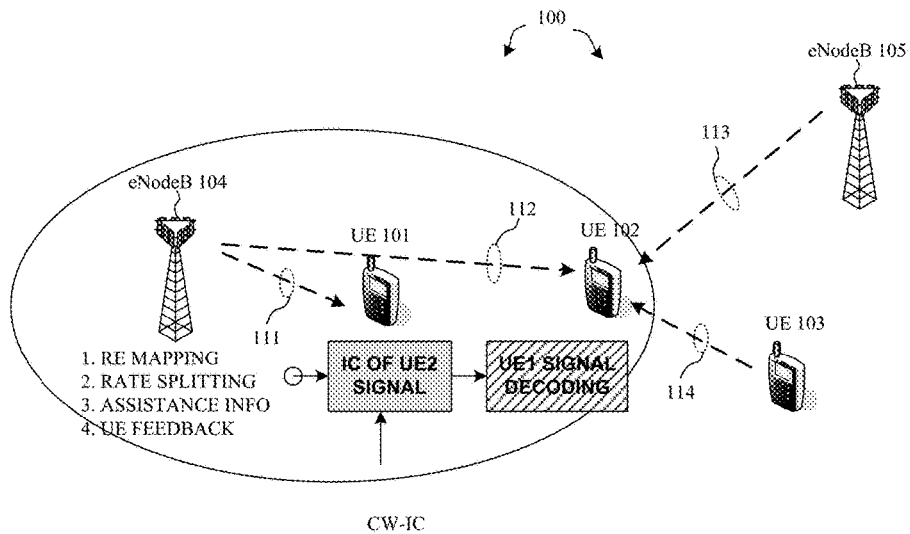
FIG. 1 illustrates a mobile communication network for interference cancellation friendly new air interface in accordance with one novel aspect.

FIG. 1 illustrates a mobile communication network 100 for interference cancellation friendly new air interface in accordance with one novel aspect. Mobile communication network 100 is an OFDM network comprising a plurality of user equipments UE 101, UE 102, UE 103, a serving base station eNB 104 and a neighboring base station eNB 105. In 3GPP LTE system based on OFDMA downlink, the radio resource is partitioned into subframes in time domain, each subframe is comprised of two slots and each slot has seven OFDMA symbols in the case of normal Cyclic Prefix (CP), or six OFDMA symbols in the case of extended CP. Each OFDMA symbol further consists of a number of OFDMA subcarriers in frequency domain depending on the system bandwidth. The basic unit of the resource grid is called Resource Element (RE), which spans an OFDMA subcarrier over one OFDMA symbol.

Several physical downlink channels and reference signals are defined to use a set of resource elements carrying information originating from higher layers. For downlink channels, the Physical Downlink Shared Channel (PDSCH) is the main data-bearing downlink channel in LTE, while the Physical Downlink Control Channel (PDCCH) is used to carry downlink control information (DCI) in LTE. The control information may include scheduling decision, information related to reference signal information, rules forming the corresponding transport block (TB) to be carried by PDSCH, and power control command. For reference signals, Cell-specific reference signals (CRS) are utilized by UEs for the demodulation of control/data channels in non-precoded or codebook-based precoded transmission modes, radio link monitoring and measurements of channel state information (CSI) feedback. UE-specific reference signals (DM-RS) are utilized by UEs for the demodulation of control/data channels in non-codebook-based precoded transmission modes.

In the example of FIG. 1, UE 101 (UE#1) is served by its serving base station eNB 104. UE#1 receives desired radio signal 111 transmitted from eNB 104. However, UE 101 also receives interfering radio signals. In one example, UE 101 receives interfering radio signal 112 transmitted from the same serving eNB 104 due to non-orthogonal multiple access (NOMA) operation intended for multiple UEs (e.g., UE 102/UE#2) in the same serving cell. In another example, UE 102 receives inter-cell interfering radio signal 113 from eNB 105 or interfering radio signal 114 from another UE 103. UE#1 and UE#2 may be equipped with an interference cancellation (IC) receiver that is capable of cancelling the contribution of the interfering signals from the desired signals. Study shows that both cell average spectral efficiency and cell edge spectral efficiency improve significantly when codeword level interference cancellation (CWIC) is used.

A new air interface that is interference cancellation friendly is proposed. In a first novel aspect, a novel resource element (RE) mapping scheme is proposed for CWIC. In a second novel aspect, a novel code rate assignment with rate splitting is proposed. In a third novel aspect, addition information is provided between eNB and UE for interference cancellation. From eNB perspective, it provides assistance information to the UE for CWIC. From UE perspective, it provides feedback information to the eNB.

Figure 2:
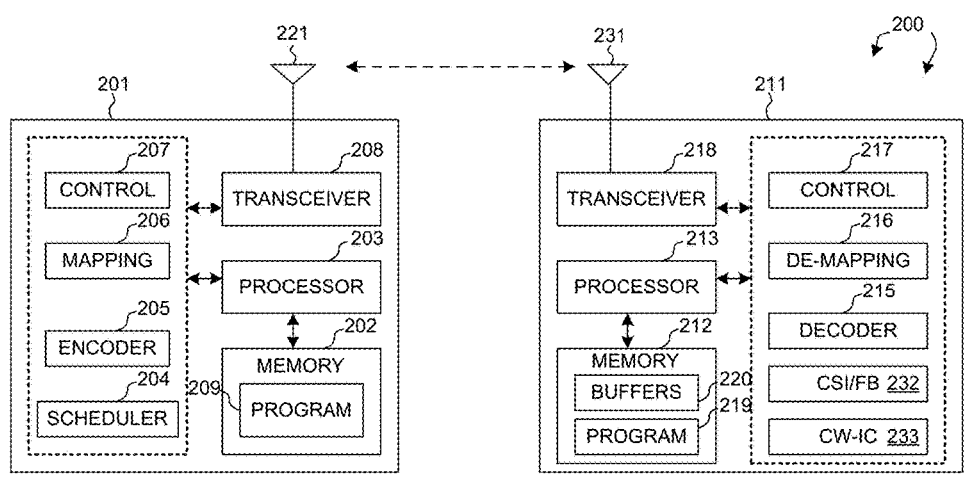
FIG. 2 is a simplified block diagram of a base station and a user equipment that carry out certain embodiments of the present invention.

FIG. 2 is a simplified block diagram of a base station 201 and a user equipment 211 that carry out certain embodiments of the present invention in a mobile communication network 200. For base station 201, antenna 221 transmits and receives radio signals. RF transceiver module 208, coupled with the antenna, receives RF signals from the antenna, converts them to baseband signals and sends them to processor 203. RF transceiver 208 also converts received baseband signals from the processor, converts them to RF signals, and sends out to antenna 221. Processor 203 processes the received baseband signals and invokes different functional modules to perform features in base station 201. Memory 202 stores program instructions and data 209 to control the operations of the base station. Similar configuration exists in UE 211 where antenna 231 transmits and receives RF signals. RF transceiver module 218, coupled with the antenna, receives RF signals from the antenna, converts them to baseband signals and sends them to processor 213. The RF transceiver 218 also converts received baseband signals from the processor, converts them to RF signals, and sends out to antenna 231. Processor 213 processes the received baseband signals and invokes different functional modules to perform features in UE 211. Memory 212 stores program instructions and data 219 to control the operations of the UE. Memory 212 also contains a plurality of soft buffers 220 for storing soft channel bits of encoded code blocks.

Base station 201 and UE 211 also include several functional modules and circuits to carry out some embodiments of the present invention. The different functional modules and circuits can be configured and implemented by software, firmware, hardware, or any combination thereof. The function modules and circuits, when executed by the processors 203 and 213 (e.g., via executing program codes 209 and 219), for example, allow base station 201 to schedule (via scheduler 204), encode (via encoder 205), mapping (via mapping circuit 206), and transmit control information and data (via control circuit 207) to UE 211, and allow UE 211 to receive, de-mapping (via de-mapper 216), and decode (via decoder 215) the control information and data (via control circuit 217) accordingly with interference cancellation capability. In one example, base station 201 performs a novel RE mapping such that the coded bits of one transport block is spread over subband and a subband has an integer multiple of code blocks. Base station 201 may also perform rate splitting and broadcast assistance information for CWIC. At the receiver side, UE 211 provides feedback information via CSI and FB circuit 232 and performs codeword level interference cancellation (CWIC) via CWIC circuit 233 to decode the code blocks and cancel the contribution of the interfering signals accordingly.

Data Transmission with Novel Re Mapping

Figure 3:
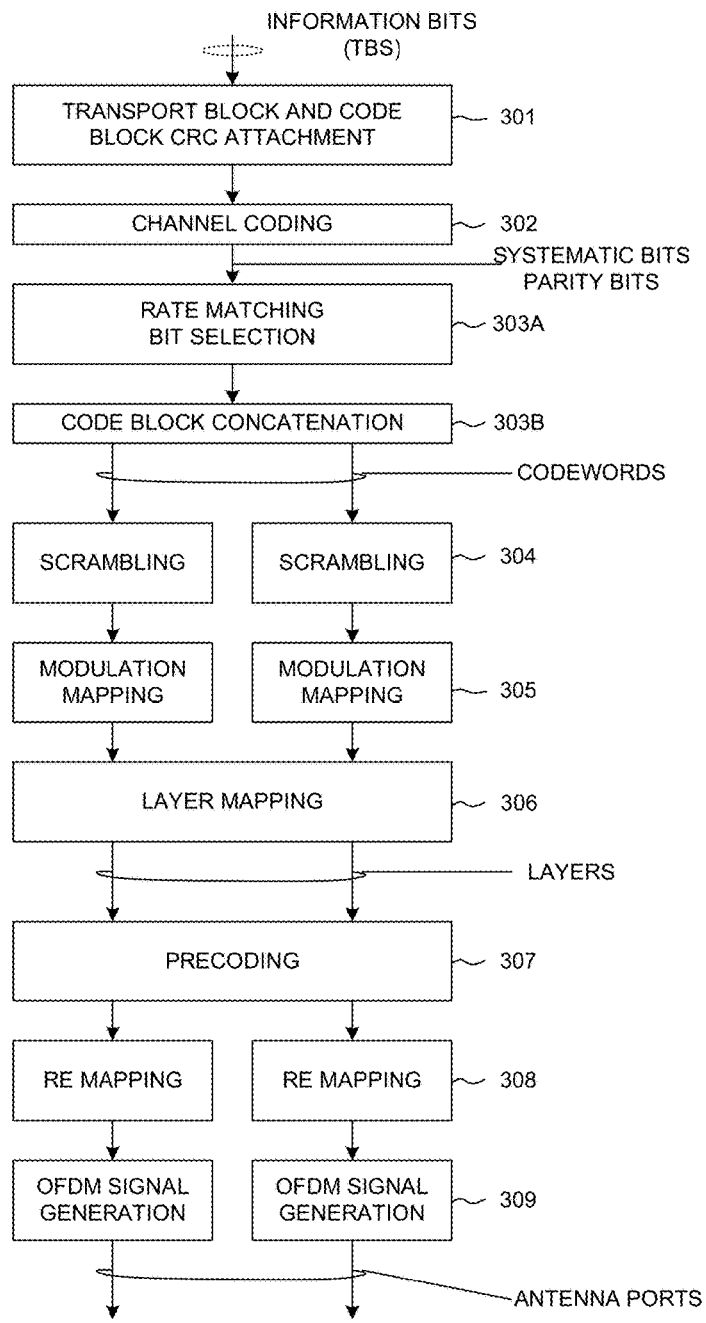
FIG. 3 illustrates functional blocks in a communication system that maps information bits of a transport block to codewords and then maps to baseband signals for transmission.

FIG. 3 illustrates functional blocks of a transmitting device in a communication system that map information bits of a transport block (TB) to codewords and then map to baseband signals for transmission. In step 301, the information bits are arranged into transport blocks (TBs) and attached with CRC. In addition, the TBs are segmented into code blocks and attached with CRC. In step 302, channel coding (forward error correction such as Turbo coding) is performed with certain code rate and generates corresponding systematic bits and parity bits. In step 303A, rate matching and bit selection is performed, which creates an output with a desired code rate. The bit selection is performed such that the encoded bits of the same code block are transmitted in the same subband. In step 303B, the encoded and rate matched code blocks are concatenated into codewords. In step 304, the codewords are scrambled based on a predefined scrambling rule. In one preferred embodiment, the scrambling code is NOT a UE-specific parameter. In step 305, modulation mapping is performed, where the codewords are modulated based on various modulation orders (e.g., PSK, QAM) to create complex-valued modulation symbols. In step 306, layer mapping is performed, where the complex-valued symbols are mapped onto different MIMO layers depending on the number of transmit antenna used. In step 307, precoding is performed with certain precoding matrix index (PMI) for each antenna port. In step 308, the complex-valued symbols for each antenna are mapped onto corresponding resource elements (REs) of physical resource blocks (PRBs). The RE mapping is performed such that the encoded bits of one transport block is spread over subband. Finally, in step 309, OFDM signals are generated for baseband signal transmission via antenna ports.

Figure 4:
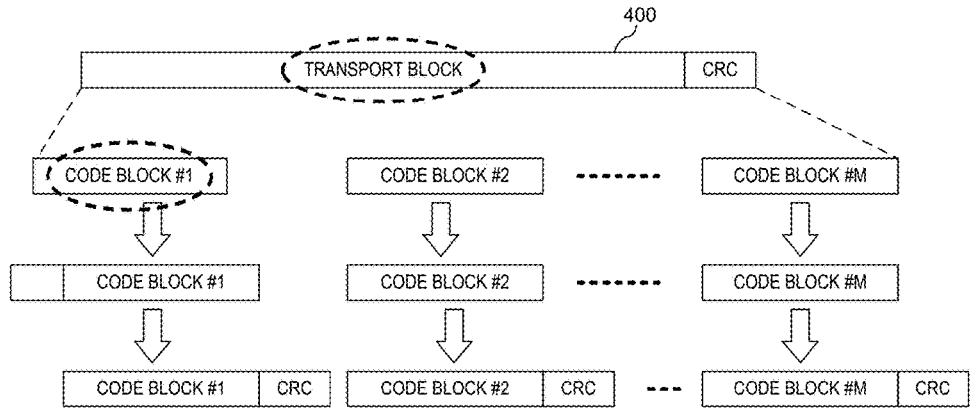
FIG. 4 illustrates one example of the segmentation of transport blocks into code blocks.

FIG. 4 illustrates one example of the segmentation of transport blocks into code blocks. A transport block TB 400 with CRC is first segmented into M code blocks. The first code block #1 is then inserted with filler bits. Per-code-block CRC is then calculated and inserted into each code block. Each code block enters channel encoder individually.

Figure 5:
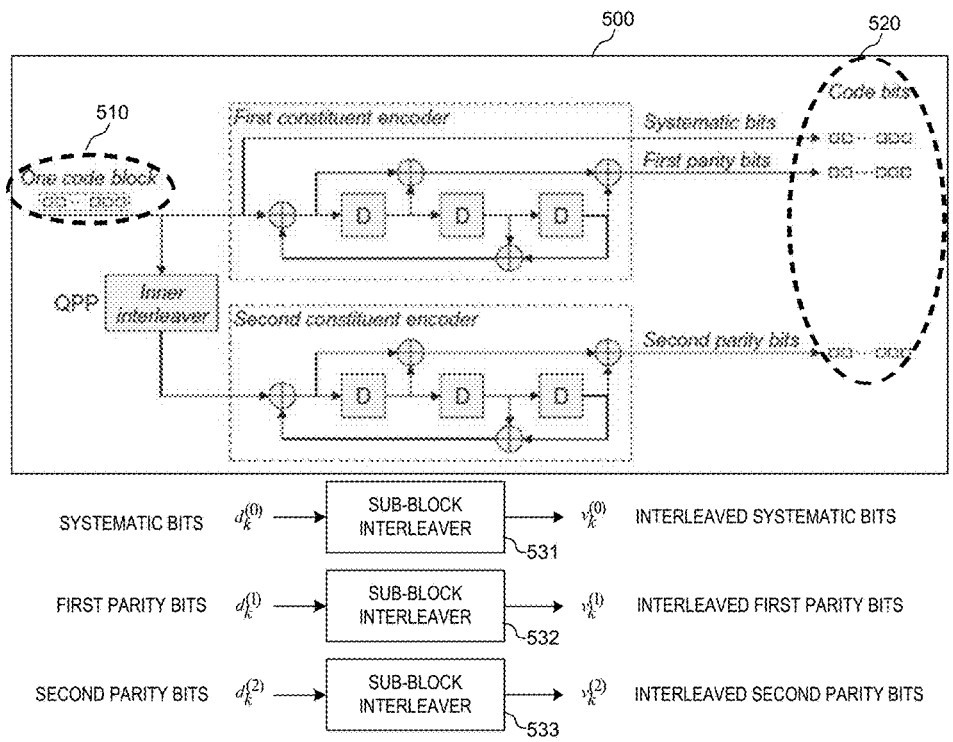
FIG. 5 illustrates one example of the Turbo Encoder used in LTE.

FIG. 5 illustrates one example of the Turbo Encoder 500 used in LTE. One code block 510 is passed into the Turbo Encoder 500 to output coded bits 520 including systematic bits, first parity bits, and second parity bits. The coded bits are then passed into sub-block interleavers 531, 532, and 533 to output interleaved systematic bits, interleaved first parity bits, and interleaved second parity bits respectively.

Figure 6:
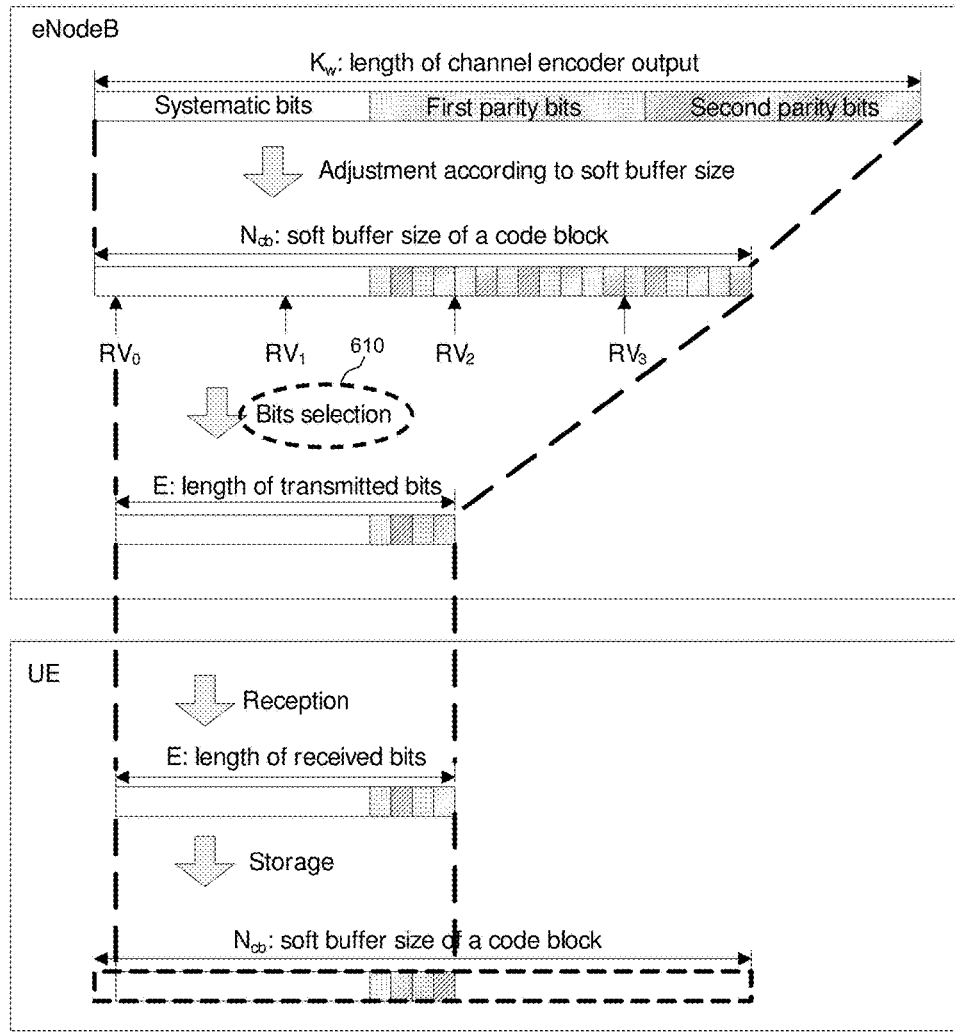
FIG. 6 an LTE rate matching procedure at the eNodeB and HARQ soft packet combining at the UE with a novel bit selection procedure.

FIG. 6 illustrates an LTE rate matching procedure at the eNodeB and HARQ soft packet combining at the UE with a novel bit selection procedure. In LTE, the rate-matching algorithm repeats or punctures the bits of a mother codeword to generate a requested number of bits according to the size of the time-frequency resource and a desired code rate that may be different from the mother code rate of the channel encoder. Besides, rate matching also needs to take into account the soft buffer size of a code block at the receiver if soft packet combining is to be used to enhance the decoding performance.

At the eNodeB transmitter, the information bits are turbo encoded with the code rate of R=1/3 to generate $K_w$ coded bits. The number of transmitted coded bits is determined based on the size of the allocated time-frequency resource and the modulation coding scheme (MCS) assigned to the UE. Two-step rate matching is applied. The first step is applied only if $N_{cb}<K_w$. The purpose is to truncate the coded bits so that the truncated coded bits do not exceed the soft buffer size $N_{cb}$. In the second step of bit selection 610, E consecutive coded bits are selected from the truncated coded bits (output of the first step), where E is the number of bits determined according to the size of allocated resource and the MCS level. The starting point of E coded bits is decided by the value of the redundancy version $RV_i$, i=0, 1, 2, 3, as shown in FIG. 6. In the event of retransmission, a different $RV_i$ is used to obtain a higher coding gain for an incremental redundancy soft packet-combining scheme.

In accordance with one novel aspect, the bit selection ensures that the coded bits of a same code block are transmitted in the same subband, and there are integer multiple number of code blocks in a subband. This can be done based on the knowledge of the allocated resource block for the transport block and the size of the subbands within the allocated resource block. The number of resource elements in a subband which a code block can occupy can be predetermined. For example, the base station needs to schedule one TB comprising a plurality of code blocks across three subbands for a UE. If there are five code blocks in a subband, and each code block can occupy 200 resource elements. Then the number of selected bits is equal to 200 times the modulation order. This is to make sure that the selected bits of a code block cannot be spread over two subbands.

At the UE receiver, the log likelihood ratio (LLRs), $\{b_j(k); k=0, 1, \ldots, E-1\}$, for the j-th (re)-transmission, called soft channel bits, are computed. If the soft buffer for the code block is empty, the soft channel bits $\{b_j(k)\}$ are stored in the $N_{cb}$-sized soft buffer; otherwise, the soft channel bits stored at the soft buffer are updated based on the newly computed $\{b_j(k)\}$. Finally, turbo decoding is performed to recover the information bits.

When CWIC is implemented in LTE, the following parameters need to be signals. First, $N_{cb}$ (soft buffer size per code block) needs to be signaled. $N_{cb}$ has tradeoff between adopted parameters and decoding performance. Second, RV (redundant version) needs to be signaled. Third, HARQ process number needs to be signaled. The base station may reserve soft buffer for interfering code blocks, which can obtain the gain of HARQ if performed. Finally, bit selection is performed so that the coded bits of the same code block are mapped to and then transmitted in the same subband and there are integer number of code blocks in each subband.

Figure 7:
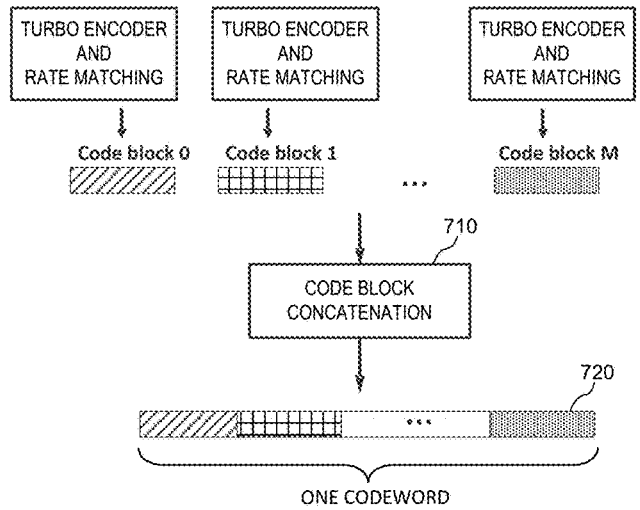
FIG. 7 illustrates one example of code block concatenation used in LTE.

FIG. 7 illustrates one example of code block concatenation used in LTE. As illustrated in FIG. 7, each code block (code block 0, 1, . . . M) enters Turbo encoder and rate matching individually to output coded bits with proper size. The coded bits of the code blocks are then concatenated by a code block concatenation circuit 710 to output one codeword 720.

Referring back to FIG. 3, the codewords are now processed by scrambling, modulation mapping, layer mapping, precoding, RE mapping, and finally OFDM signals are generated for baseband signal transmission via antenna ports. For CWIC, the receiver needs to know the mapping rules of how the OFDM signals are processed in order to reconstruct the contribution of interference. Descrambling is one critical issue that a receiver would encounter when performing CWIC. The transmitter scrambles the coded information bits for PDSCH with random bits generated by a scrambler, e.g., RNTI, which is only known by the receiver scheduled to receive this PDSCH.

A receiver has to descramble the demodulated signal before decoding and checking the CRC. While the RNTI associated with an interfering signal is not revealed to a victim UE, control information to decode/re-encode the TB associated with the interfering signal cannot be obtained by decoding the PDCCH associated with the interfering signal and has to be signaled to the victim UE by some means. Furthermore, in current specification there is no way to descramble other co-channel signal because the scrambling rule is associated with the RNTI of each UE. Due to heavy overhead of RNTI, signaling the RNTI of interference is impossible. Security is another concern since the DCI of the interfering UE would become solvable by others with known RNTI.

In one advantageous aspect of supporting CWIC, the scrambling rule for PDSCH becomes either (1) cell-specific; or (2) replace the scrambler by N, which may be one configured value, or multiple configurable values and then can be chosen by additional signaling. The key is the scrambling should not be a function of UE's RNTI. As a result, the protection for PDCCH is still preserved since RNTI is unknown to other receivers. The victim receiver then explicitly or implicitly receives the scrambling rule for the co-channel signals to be decoded/re-encoded. Based on the knowledge of scrambling rules for both desired signal and interfering signal, the victim receiver can perform CWIC accordingly.

Figure 8:
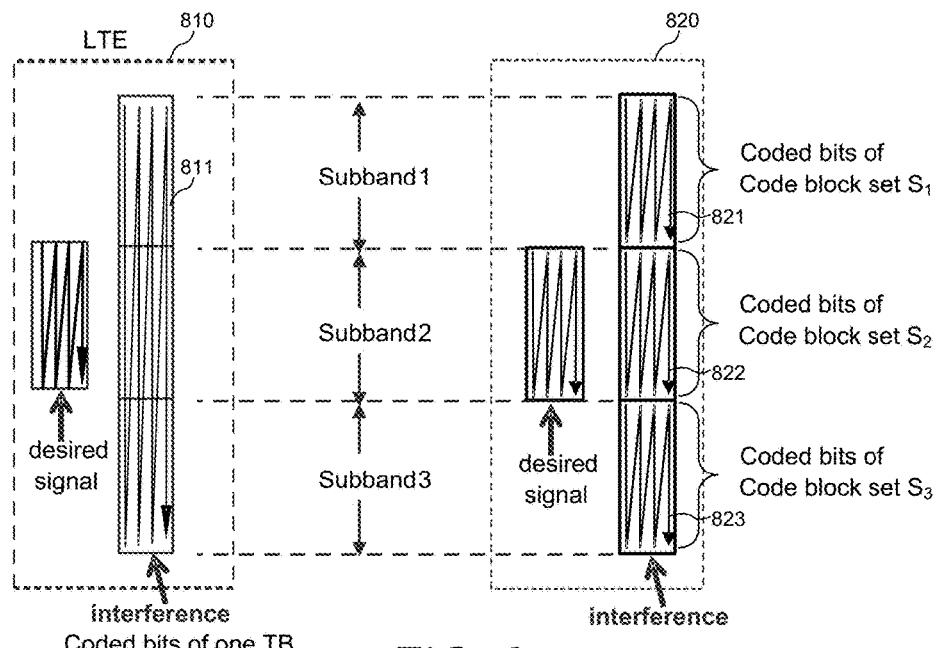
FIG. 8 illustrates one embodiment of resource element (RE) mapping in accordance with one novel aspect of the present invention.

FIG. 8 illustrates one embodiment of resource element mapping in accordance with one novel aspect of the present invention. Assume a UE needs to decode a desired signal and an interference signal. As depicted by box 810, the desired signal occupies a resource block set that spans across one subband 2, while the interference signal occupies a resource block set that spans across three subbands (subbands 1, 2, and 3). In LTE system, the basic scheduling unit is the resource block set, and the data delivered in the different subbands of the same resource block set corresponds to the same TB. For example, data is encoded and mapped along arrow 811 to form the TB. Thus, for a UE to decode the interference signal, the UE needs to decode the data in all subbands, even if only subband 2 is scheduled for the desired signal.

In accordance with one novel aspect, a base station uses one subband as the basic scheduling unit for each transport block if CWIC is configured, e.g., by static or semi-static signaling. The key point is that the coded bits of a same code block are transmitted in the same subband. The transmission of a subband includes an integer multiple number of code blocks. The code block set $S_i$ is defined as $b_j \in S_i$ if the code block $b_j$ is transmitted in subband i. As depicted by box 820, for the interference signal, the base station generates encoded bits of code block set $S_1$ and maps to REs in subband 1 along arrow 821, generates encoded bits of code block set $S_2$ and maps to REs in subband 2 along arrow 822, and generates encoded bits of code block set $S_3$ and maps to REs in subband 3 along arrow 823. In one specific example, there is only one TB to be mapped to all three subbands. The bit selection and RE mapping have more constraints that the selected bits of a code block do not being mapped spreading across over two subbands. As a result, the UE only needs to decode the interfering code block set $S_2$ at subband 2. In order to do that, the size of the interfering code block set $S_2$ needs to be signaled to the UE. In general, parameters required to decode the interfering code blocks at subbands co-scheduled with desired transport block can be inferred from network signaling or blind detection, e.g., size of information bits. Note that CWIC is performed only at some instances when appropriate. For example, it is not performed near the end of a file transmission, and it is not performed at retransmission when IR is used.

Figure 9:
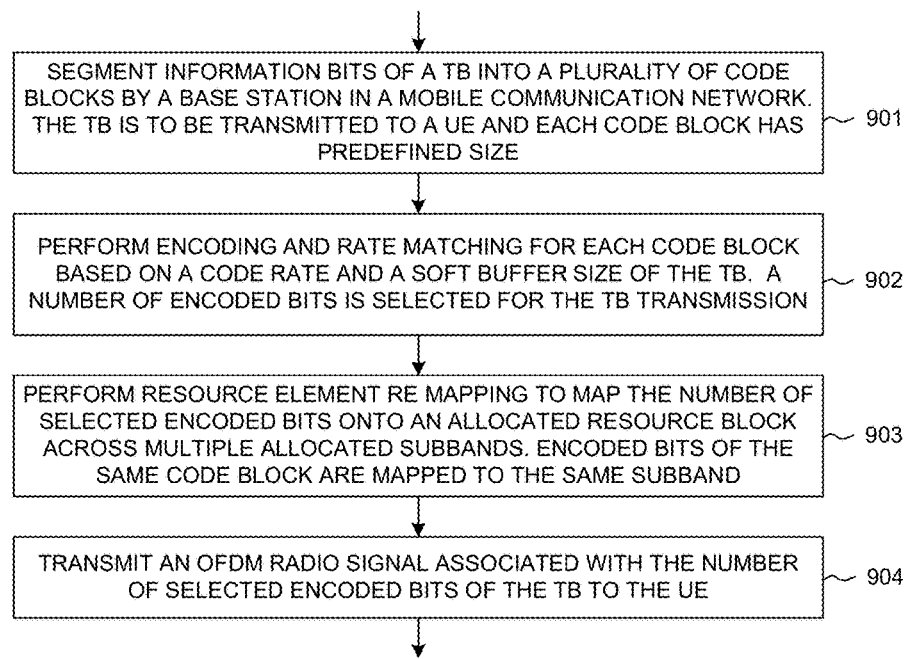
FIG. 9 is a flow chart of a method of resource element mapping from eNB perspective in accordance with one novel aspect.

FIG. 9 is a flow chart of a method of resource element mapping from eNB perspective in accordance with one novel aspect. In step 901, a base station segments information bits of a transport block (TB) into a plurality of code blocks in a mobile communication network. The TB is to be transmitted to a user equipment (UE) and each code block has a predefined size. In step 902, the base station performs encoding and rate matching for each code block based on a code rate and a soft buffer size of the TB, wherein a number of encoded bits is selected for the TB transmission. In step 903, the base station performs resource element (RE) mapping to map the number of selected encoded bits onto an allocated resource block across multiple allocated subbands, wherein encoded bits of the same code block are mapped to the same subband. In step 904, the base station transmits an OFDM radio signal associated with the number of selected encoded bits of the TB to the UE.

Code Rate Assignment—Rate Splitting

Interference problems exist for massive MU-MIMO under different deployment scenarios. For non-ultra-dense scenario, MU transmission is via different beams. Interference comes from sidelobe, reflection, diffraction, or non-ideal beamforming. There is certain interference and interference cancellation is helpful. For ultra-dense scenario, MU transmission is via the same beam (i.e., multi-user superposition transmission (MUST)). It is difficult to separate signals in spatial domain due to crowded user. Wider beamwidth by <6 GHz massive MIMO antenna results in worse interference. Interference cancellation capability can significantly improve system capacity. Other interference problems exist in cellular networks. For example, inter-cell interferences come from neighbor cells for cell edge users, and DL-to-UL and UL-to-DL interferences result from dynamic time division duplex (TDD) configuration.

User equipments (UEs) equipped with interference cancellation (IC) receiver is capable of cancelling the contribution of the interfering signals from the desired signals. Study shows that both cell average spectral efficiency and cell edge spectral efficiency improve significantly when codeword level interference cancellation (CWIC) is used. However, not all interference signals can be easily decoded and canceled. For example, the interference signal may be transmitted with a MCS level such that its SNR is too low for a victim receiver to decode and cancel properly.

Figure 10:
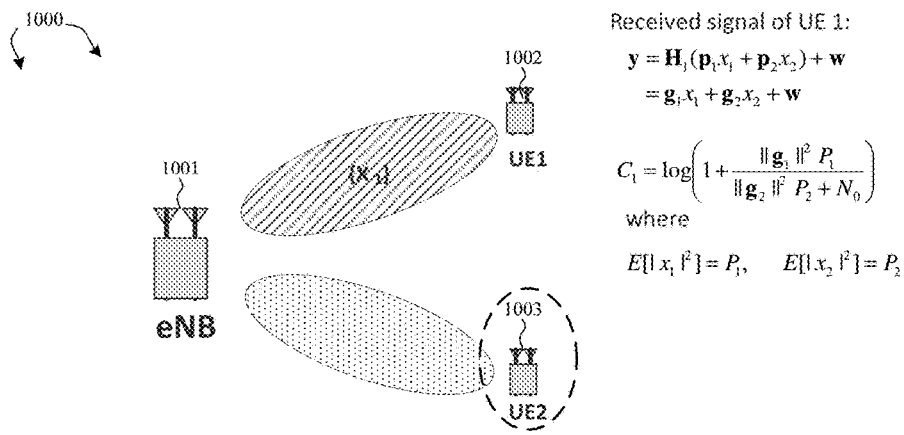
FIG. 10 illustrates one embodiment of interference wherein an interference signal is not decodable and cannot be cancelled by a victim receiver.

FIG. 10 illustrates one embodiment of interference wherein an interference signal is not decodable and cannot be cancelled. In mobile communication network 1000, a serving base station eNB 1001 schedules UE 1002 (UE#1) and UE 1003 (UE#2) for data transmission. In one example, UE#2 receives interfering radio signal carrying codeword $\{x_1\}$ transmitted from the same serving eNB 1001 due to MU-MIMO operation intended for multiple UEs (e.g., UE 1002/UE#1) in the same serving cell. UE#2 may be equipped with an IC receiver that is capable of cancelling the contribution of the interfering signals from the desired signals.

According to the rule of signal reception of MU-MIMO interference cancellation, the receiver of UE#2 should perform codeword level interference cancellation (CWIC) for the codeword $\{x_1\}$ intended to UE#1. Specifically, UE#2 decodes the codeword $\{x_1\}$ intended to UE#1, reconstructs the contribution of the UE#1's signal in the received signal, and then subtracts the reconstructed signal from the received signal to form a clean received signal. UE#2 can therefore decode its own signal via the clean received signal. However, UE#2 may not be able to decode $\{x_1\}$. For example, the channel quality of UE#1 and UE#2 for receiving $\{x_1\}$ can be very different. For example, the channel quality of UE#1 can be good while the channel quality of UE#2 can be poor because the precoder for $\{x_1\}$ is targeted for UE#1 but not for UE#2. As a result, the code rate of $\{x_1\}$ is too high such that the received SNR of $\{x_1\}$ is too low for UE#2 to decode.

Figure 11:
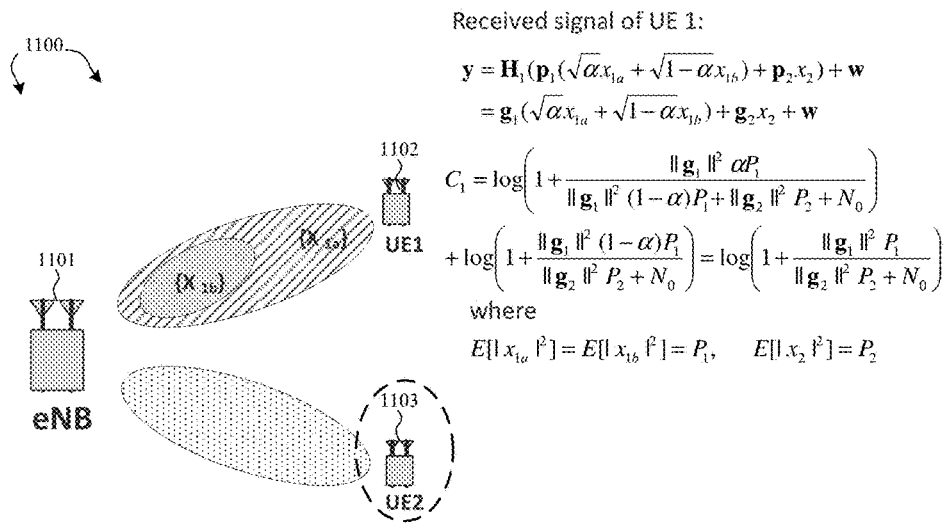
FIG. 11 illustrates one embodiment of code rate assignment with rate splitting from a base station to two UEs in a mobile communication network in accordance with one novel aspect.

FIG. 11 illustrates one embodiment of code rate assignment with rate splitting from a base station to two UEs in a mobile communication network 1100 in accordance with one novel aspect. Mobile communication network 1100 comprises a base station eNB 1101, a first UE 1102 (UE#1), and a second UE 1103 (UE#2). Base station eNB 1101 schedules UE#1 and UE#2 for data transmission. In one example, codeword $\{x_1\}$ is intended to be transmitted to UE#1. However, codeword $\{x_1\}$ causes interference to UE#2. In order to guarantee that UE#2 is able to decode and cancel at least part of the codeword $\{x_1\}$ by performing CWIC, eNB 1101 decomposes the codeword $\{x_1\}$ into two codewords $\{x_{1a}\}$ and $\{x_{1b}\}$. The two codewords can be applied with different code rates and/or modulation order. More specifically, the code rate or modulation order of codeword $\{x_{1a}\}$ is set appropriately so that UE#2 can decode and cancel $\{x_{1a}\}$ under the channel quality of UE#2. UE#2 can therefore cancel $\{x_{1a}\}$ and treat $\{x_{1b}\}$ as noise. Typically, the channel quality of UE#2 for receiving radio signal intended to UE#1 is poorer than the channel quality of UE#1 for receiving radio signal intended to UE#1 itself. As a result, the modulation and coding scheme (MCS) for $\{x_{1a}\}$ can be lower than the MCS for $\{x_{1b}\}$ such that UE#2 is able to decode and cancel $\{x_{1a}\}$.

In a first example of rate splitting, a first transport block TB1 with all the code blocks is assigned with a first code rate, and a second transport block TB2 with all the code blocks is assigned with a second code rate. The two TBs are transmitted to the UE over the same allocated REs. In a second example of rate splitting, a transport block TB is decomposed into two portions. A first portion of code blocks of the TB is assigned with a first code rate, and these first portion of code blocks are concatenated to form the first codeword; a second portion of code blocks of the same TB is assigned with a second code rate, and these second portion of code blocks are concatenated to form the second codeword. The two codewords are then transmitted to the UE over the same allocated REs. Note that from UE#1 perspective, UE#1 has no loss in achievable rate. FIG. 10 depicts the received signal of UE#1 when there is no rate splitting is applied. FIG. 11 depicts the received signal of UE#2 when rate splitting is applied.

Figure 12:
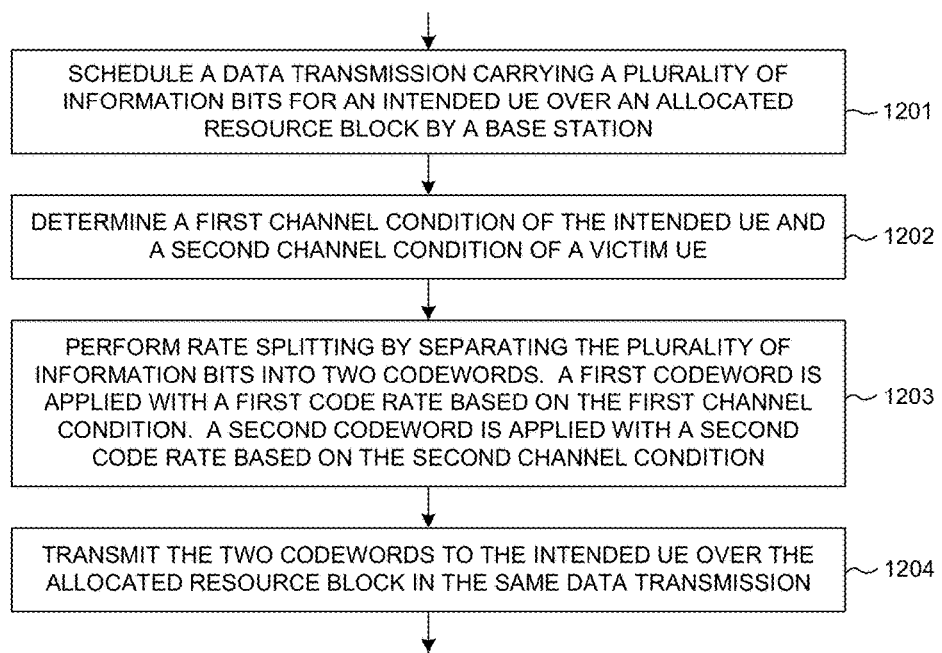
FIG. 12 is a flow chart of a method of code rate assignment with rate splitting to enable CWIC in accordance with a novel aspect.

FIG. 12 is a flow chart of a method of code rate assignment with rate splitting to enable CWIC in accordance with a novel aspect. In step 1201, a base station schedules a data transmission carrying a plurality of information bits for an intended user equipment (UE) over an allocated resource block. In step 1202, the base station determines a first channel condition of the intended UE and a second channel condition of a victim UE. In step 1203, the base station performs rate splitting by separating the plurality of information bits into two codewords. A first codeword is applied with a first code rate based on the first channel condition, and a second codeword is applied with a second code rate base on the second channel condition. In step 1204, the base station transmits the two codewords to the intended UE over the allocated resource block in the same data transmission. In one embodiment, the second code rate is determined such that the victim UE is able to decode and cancel the second codeword using CWIC.

Assistance Info and UE Feedback

Various types of interference cancellation (IC) receivers are shown to provide significant gain if some characteristics of interference are available at victim nodes. Commonly investigated IC techniques in literature may include symbol-level based IC (SLIC) and codeword-level IC (CWIC). SLIC is an IC technique that detects interfering signal, which is supposed to be finite-constellation modulated, in a per-symbol basis. CWIC is referred to that a receiver decodes and re-encodes interference codeword to reconstruct the contribution of the interference signal on its received signal. Comparing to SLIC, a receiver needs more information on interference to access CWIC, such as modulation and coding scheme (MCS) index and the rule scrambling the bit stream of interference. Obtaining the interference characteristics, such as the modulation order or encoding rules of the interfering signal, is important for IC techniques. The characteristics could be either blindly detected by victim receiver or informed from network side.

In the "Network Assisted Interference Cancellation and Suppression" (NAICS) study item, various parameter candidates helpful for interference cancellation were identified. For example, parameters that are higher-layer configured per the current specifications (e.g., transmission mode, cell ID, MBSFN subframes, CRS antenna ports, $P_A$, $P_B$); parameters that are dynamically signaled per the current specifications (e.g., CFI, PMI, RI, MCS, resource allocation, DMRS ports, $n_{ID}^{DMRS}$ used in TM10); and other deployment related parameters (e.g., synchronization, CP, subframe/slot alignment). Although it is possible to let receiver detect or estimate these parameters associated with the interfering signal without any aid of signaling, the complexity cost could be very huge to estimate them. On the other hand, since interference characteristic may change for every PRB/subframe, dynamic signaling all the parameters is not feasible.

In accordance with one novel aspect, some parameters of a codeword are broadcasted to any communication equipment in the system, including eNBs and UEs. The signaling carrying the parameters of interference is Non-UE-Specific, and the signal is detectable and decodable if the received signal quality exceeds a certain level. This is in contrast to traditional LTE systems, where the parameters are typically included in PDCCH control channel, and is only decodable by the desired UE of the codeword. With such signaling of parameters of interference, CWIC can be performed by any receiver without extra signaling needed. For example, the Modulation Order of the i-th subband (MODi) and the Code Rate of the i-th subband (CodeRatei) for all i's of the PDSCH of an antenna port are carried in a signal detectable and decodable to any communication equipment in the system if the received signal quality exceeds a certain level.

Figure 13:
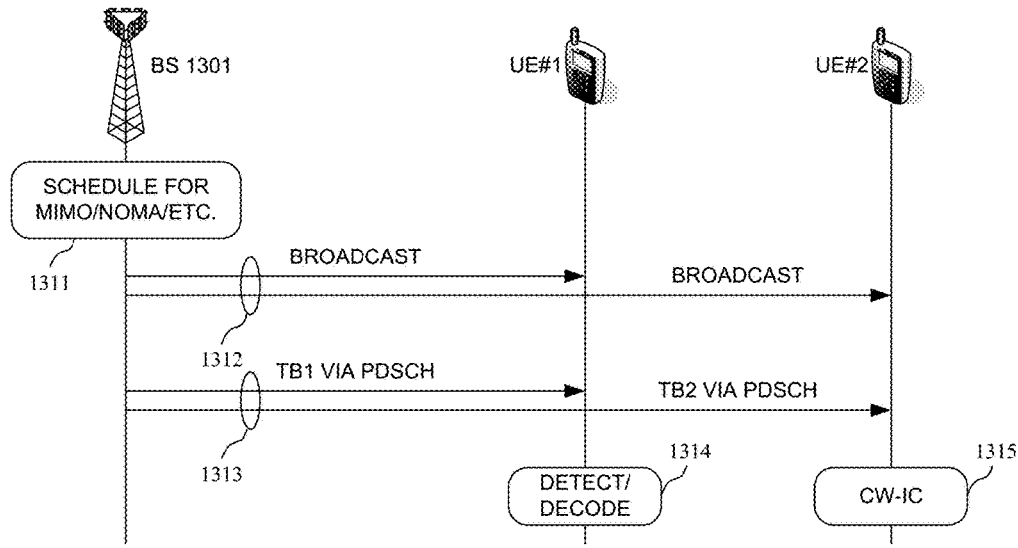
FIG. 13 illustrates a sequence flow between a base station and two UEs where the base station broadcasts assistance information to UEs for CWIC.

FIG. 13 illustrates a sequence flow between a base station and two UEs where the base station broadcasts assistance information for CWIC. In step 1311, a serving base station BS 1301 schedules a first UE#1 for data transmission. The data transmission may be associated with MU-MIMO, NOMA, SU-MIMO or any other transmission schemes. In step 1312, the BS broadcasts assistance information to all base stations and UEs including UE#2 over certain predefined time-frequency resource such that all base stations and UEs within the cell coverage can receive the assistance information. UE#2 may be served by BS 1301 or served by other neighboring base stations. The assistance information may include information of the MODi and CodeRatei of the i-th subband for all i's of a PDSCH intended for UE#1. In step 1313, the BS transmits a radio signal carrying a transport block (TB1) to UE#1 via the PDSCH. The BS also transmits a radio signal carrying TB2 via the same or another PDSCH. The radio signal carrying TB1 is an interfering signal to UE#2. In step 1314, UE#1 detect the desired signal and decodes TB1. In step 1315, UE#2 performs CWIC to cancel the contribution from the interfering radio signal based on the assistance information broadcasted from BS 1301. As a result, UE#2 is able to detect and decode its own desired radio signal carrying TB2 accordingly.

In order to assign proper modulation and coding scheme (MCS) level, the transmitting station is required to know the Channel State Information (CSI) of the radio channels connecting it to each of the receiving stations for transmission. In 3GPP LTE systems, it is common for the receiving stations (e.g., UEs) to measure CSI and report CSI to the transmitting station (e.g., eNB) via an uplink feedback channel. The content of CSI feedback contains RI (rank indicator), CQI (channel quality indicator), and PMI (precoding matrix indicator) for each downlink channel. In addition to CSI feedback, if Hybrid Automatic Repeat Request (HARQ) is performed, then HARQ ACK/NACK status provides important feedback information to eNB for MCS level assignment.

In Time Division Duplex (TDD) systems, channel reciprocity can be used to aid MCS level assignment at eNB. Therefore, the MCS level of a downlink channel can be assigned based on the estimated channel condition of its corresponding uplink channel. However, there is error in the estimate of channel response matrix by means of channel reciprocity. For example, measurement error of sounding reference signal, calibration error, channel variation, etc. As a result, the accuracy of MCS assignment may not be satisfactory.

In accordance with one novel aspect, UE reports additional indicators for channel state information. The first indicator is $CQI\_self_1$, which is reported periodically or by triggering. The $CQI\_self_1$ indicator has the same purpose as the CQI defined in LTE, and it represents the channel quality for the initial transmission of a transport block. The second indicator is $HARQ\_ACK\_self_n$, $n>=1$, which is reported when receiving a desired transport block. The $HARQ\_ACK\_self_n$ indicator corresponds to the decoding status of a desired transport block occurring at the n-th transmission of the desired transport block. The third indicator is $CQI\_lack\_self_n$, $n>=1$: which is reported when $HARQ\_ACK\_self_n$=NACK. The $CQI\_lack\_self_n$ indicator corresponds to the shortage of spectral efficiency (bps/Hz) of the n-th transmission of a desired transport so that the decoding of the n-th transmission of the desired transport can succeed. Finally, the fourth indicator is $HARQ\_ACK\_interference_n$, $n>=1$: which is reported when $HARQ\_ACK\_self_n$=NACK. The $HARQ\_ACK\_interference_n$ indicator corresponds to the decoding status of an interfering transport block occurring at the n-th transmission of the desired transport block.

Figure 14:
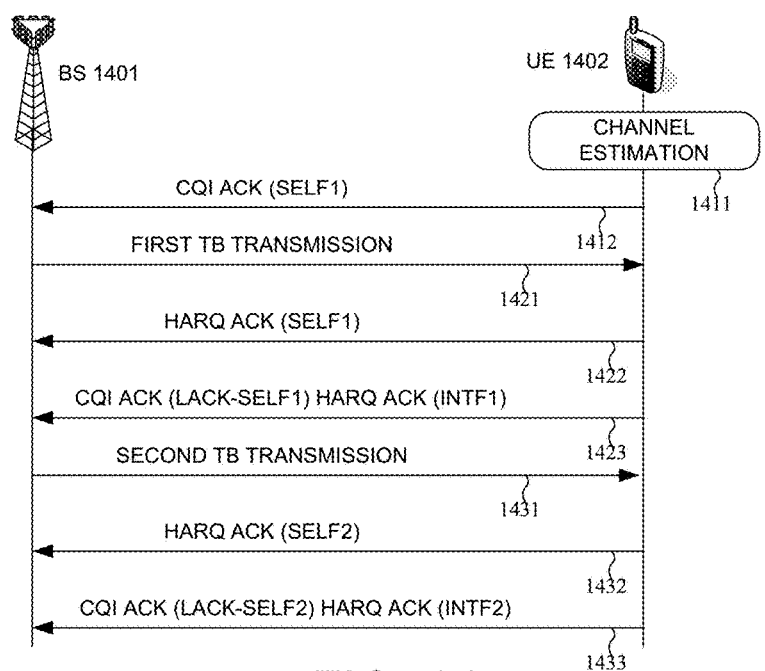
FIG. 14 illustrates a sequence flow between a base station and two UEs where the UEs provide additional feedback information for MCS level assignment.

FIG. 14 illustrates a sequence flow between a base station and a UE where the UE provides additional feedback information for MCS level assignment. In step 1411, UE 1402 performs channel estimation and determines the CSI feedback for the downlink wireless channel. In step 1412, UE 1402 reports $CQI\_self_1$ indicator to BS 1401. In step 1421, BS 1401 determines MCS and transmits a transport block TB for the first time. In step 1422, UE 1402 reports $HARQ\_ACK\_self_1$ indicator to BS 1401. Under the situation when $HARQ\_ACK\_self_1$=NACK, then in step 1423, UE 1402 reports additional feedback information, including $CQI\_lack\_self_1$ indicator and $HARQ\_ACK\_interference_1$ indicator. These two additional indicators provide more detailed information about the channel quality and interference condition of the first TB transmission with respect to the decoding of the desired transport block. Next, in step 1431, BS 1401 determines MCS and transmits the TB for the second time. In step 1432, UE 1402 reports $HARQ\_ACK\_self_2$ indicator to BS 1401. Under the situation when $HARQ\_ACK\_self_2$=NACK, then in step 1433, UE 1402 reports additional feedback information of $CQI\_lack\_self_2$ indicator and $HARQ\_ACK\_interference_2$ indicator. Based on the additional information that is feedback from UE 1402, BS 1401 can provide more accurate MCS level assignment.

Figure 15:
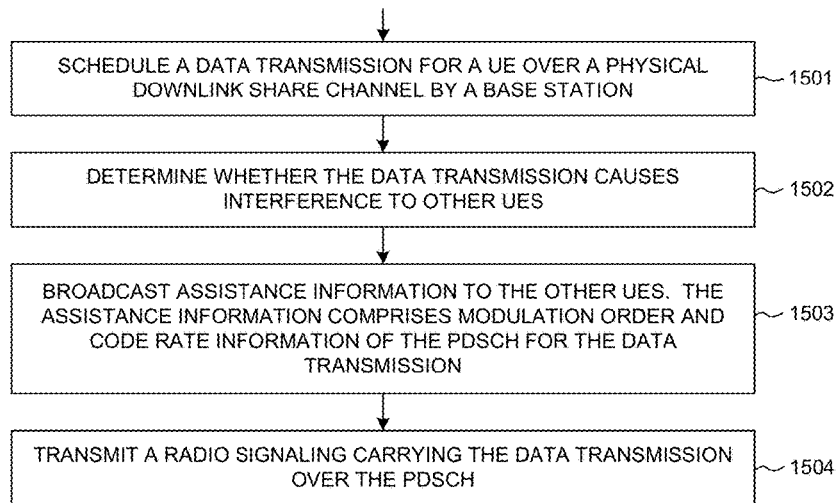
FIG. 15 is a flow chart of a method of broadcasting assistance information for CWIC from eNB perspective in accordance with one novel aspect.

FIG. 15 is a flow chart of a method of broadcasting assistance information for CWIC from eNB perspective in accordance with one novel aspect. In step 1501, a base station schedules a data transmission for a user equipment (UE) over a physical downlink shared channel (PDSCH). In step 1502, the base station determines whether the data transmission causes interference to other UEs. I step 1503, the base station broadcasts assistance information to the other UEs. The assistance information comprises modulation order and code rate information of the PDSCH for the data transmission. In step 1504, the base station transmits a radio signal carrying the data transmission over the PDSCH.

Figure 16:
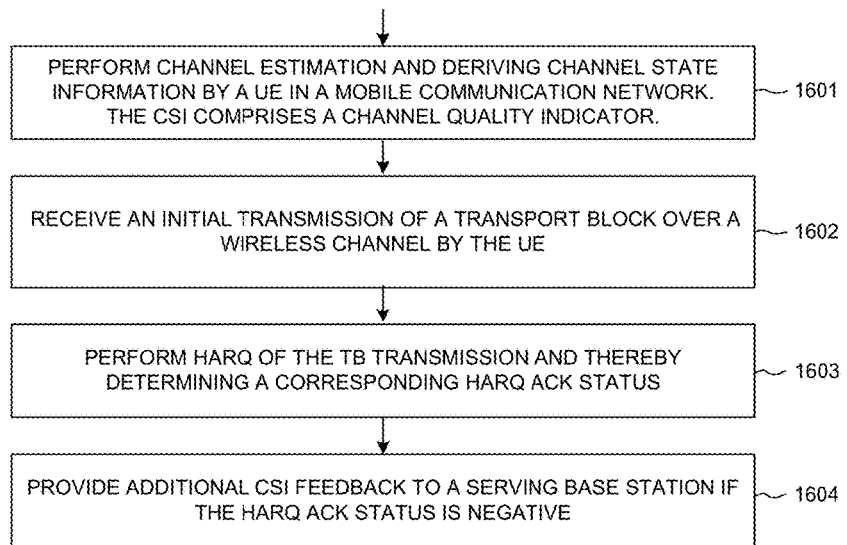
FIG. 16 is a flow chart of a method of providing feedback for MCS level assignment from UE perspective in accordance with one novel aspect.

FIG. 16 is a flow chart of a method of providing feedback for MCS level assignment from UE perspective in accordance with one novel aspect. In step 1601, a user equipment (UE) performs channel estimation and deriving channel station information (CSI) in a mobile communication system. The CSI comprises a channel quality indicator (CQI). In step 1602, the UE receives an initial transmission of a transport block (TB) over a wireless channel. In step 1603, the UE performs Hybrid Automatic Repeat Request (HARQ) of the TB transmission and thereby determining a corresponding HARQ acknowledgement (ACK) status. In step 1604, the UE provides additional CSI feedback to a serving base station if the HARQ ACK status is negative.

Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:
1. A method, comprising:
   scheduling a data transmission carrying a plurality of information bits for an intended user equipment (UE) over an allocated resource block by a base station;
   determining a first channel condition of the intended UE and a second channel condition of a victim UE;

performing rate splitting by separating the plurality of information bits into two codewords, wherein a first codeword is applied with a first code rate based on the first channel condition, and wherein a second codeword is applied with a second code rate base on the second channel condition; and transmitting the two codewords to the intended UE over the allocated resource block in the same data transmission of multi-user multiple-input multiple-output (MU-MIMO), wherein the base station performs rate splitting such that the victim UE can apply codeword-level interference cancellation for the MU-MIMO transmission.

2. The method of claim 1, wherein the first codeword is formed from a first transport block, and wherein the second codeword is formed from a second transport block.

3. The method of claim 1, wherein the first and the second codewords are formed from a transport block.

4. The method of claim 1, wherein the first channel condition has a higher channel quality than the second channel condition, and wherein the first code rate is higher than the second code rate.

5. The method of claim 1, wherein the first codeword is applied with a first modulation order, and wherein the second codeword is applied with a second modulation order.

6. The method of claim 5, wherein the first channel condition is better than the second channel condition, and wherein the first modulation order is higher than the second modulation order.

7. The method of claim 1, wherein the second code rate is determined based on the second channel condition such that the victim UE can decode the second codeword and apply codeword-level interference cancellation.

8. The method of claim 1, wherein the base station determines the first and the second channel conditions by performing channel estimation.

9. The method of claim 1, wherein the base station determines the first and the second channel conditions by receiving channel station information from the intended UE and the victim UE.

10. A base station, comprising:
a scheduler that schedules a data transmission carrying a plurality of information bits for an intended user equipment (UE) over an allocated resource block;
a channel estimation circuit that determines a first channel condition of the intended UE and a second channel condition of a victim UE;
a control circuits that performs rate splitting by separating the plurality of information bits into two codewords, wherein a first codeword is applied with a first code rate based on the first channel condition, and wherein a second codeword is applied with a second code rate base on the second channel condition; and
a transmitter that transmits the two codewords to the intended UE over the allocated resource block in the same data transmission of multi-user multiple-input multiple-output (MU-MIMO), wherein the base station performs rate splitting such that the victim UE can apply codeword-level interference cancellation for the MU-MIMO transmission.

11. The base station of claim 10, wherein the first codeword is formed from a first transport block, and wherein the second codeword is formed from a second transport block.

12. The base station of claim 10, wherein the first and the second codewords belong to a transport block.

13. The base station of claim 10, wherein the first channel condition has a higher channel quality than the second channel condition, and wherein the first code rate is higher than the second code rate.

14. The base station of claim 10, wherein the first codeword is applied with a first modulation order, and wherein the second codeword is applied with a second modulation order.

15. The base station of claim 14, wherein the first channel condition is better than the second channel condition, and wherein the first modulation order is higher than the second modulation order.

16. The base station of claim 10, wherein the second code rate is determined based on the second channel condition such that the victim UE can decode the second codeword and apply codeword-level interference cancellation.

17. The base station of claim 10, wherein the base station determines the first and the second channel conditions by performing channel estimation.

18. The base station of claim 10, wherein the base station determines the first and the second channel conditions by receiving channel station information from the intended UE and the victim UE.

* * * * *